J. Reed.
Steering Apparatus.
No. 91,089. Reissued Dec. 4, 1860.
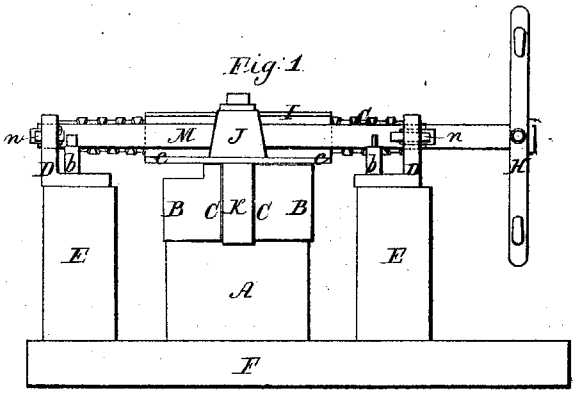
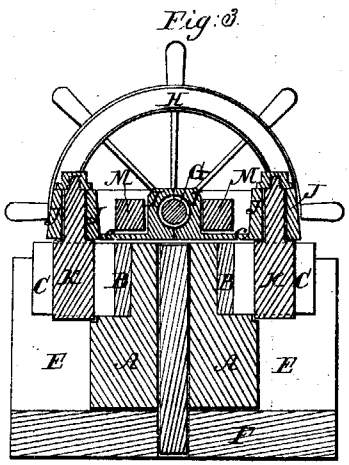
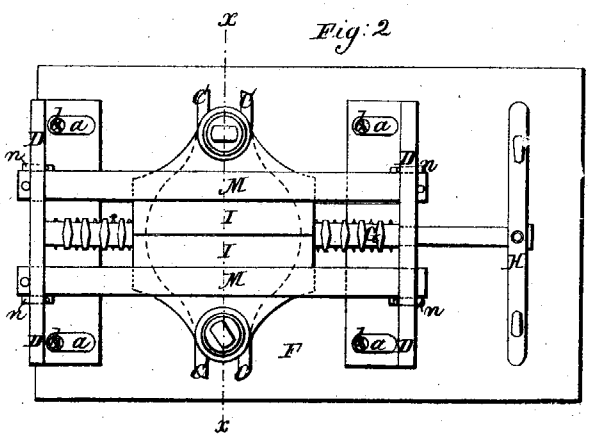
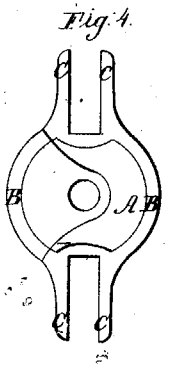
M. PETERS, PHOTO-LITHOGRAPHER, WASHINGTON, D. C.

UNITED STATES PATENT OFFICE.

CATHARINE M. HUNT, OF BOSTON, MASS., ASSIGNEE OF JESSE REED.

IMPROVEMENTS IN STEERING APPARATUS.

Specification forming part of Letters Patent No. 12,488, dated March 6, 1855; Reissue No. 1,089, dated December 4, 1860.

*To all whom it may concern:*

Be it known that I, CATHARINE M. HUNT, of Boston, in the county of Suffolk and State of Massachusetts, assignee of Letters Patent of the United States granted to JESSE REED, of Marshfield, in the county of Plymouth and State aforesaid, on the 6th day of March, A. D. 1855, for certain Improvements in Steering Apparatus, which Letters Patent were assigned to me and such assignment duly recorded at the Patent Office at Washington, D. C.; believing that said Letters Patent are inoperative and invalid by reason of a defective or insufficient specification and claim, I have surrendered the same, and, according to act of Congress in such case made and provided, have applied for a reissue of Letters Patent for the aforesaid improvements under the following specification and the accompanying drawings, of which—

Figure 1 represents a side elevation of a steering apparatus containing the said invention. Fig. 2 is a plan of it. Fig. 3 a vertical section taken on the line *x x* of Fig. 2. Fig. 4 is a top view of the rudder-head and its metallic collar or cap and its slots.

Similar letters where they occur in the several figures denote like parts.

The nature of the invention of the said JESSE REED consists in combining with the divided nut adjustable bars, supported in the bearing-pedestals, which may be forced up against said nut or the sections thereof, to produce friction between the nut and screw, and to prevent it from being broken or bent by the sudden action of the sea against the rudder, and also in so connecting said bearing-pedestals and the parts connected with or supported by them to the stanchions, by means of guide-pins and oblong slots, through which said pins pass, that the bearing-pedestals and all parts connected with them may move forward and back and up and down, in order to follow the fore-and-aft, and up-and-down movements of the rudder-head.

To enable others skilled in the art to make and use my invention, I will proceed to describe the same, with reference to the drawings, in which—

A represents the rudder-head. B is the metallic ring or hoop, fitted around the rudder-head, as shown in Fig. 4, and having projections C C thereon at opposite sides of the rudder-head. D D are two bearing-pedestals, arranged on the stanchions E E, which are firmly connected with the deck F.

The pedestals D have in their bases, at or near each of their ends, oblong slots *a a*, through which pins or studs *b b* pass into the stanchions E. By this mode of connecting the pedestals to the stanchions they have a yielding or an adjusting motion to the fore-and-aft movement of the rudder, when such movement may be produced by a heavy sea, in which case the pedestals may also rise upon said pins they, the said pins, projecting upward far enough for the purpose so as to yield upward when the rudder may be lifted in that direction, and thus the force of the sea will be expended on the rudder by allowing the latter and the pedestals to yield to it, whereas, were the pedestals rigidly fastened to the stanchions, breakage of them or their fastenings or some of the operative parts might ensue.

The screw-shaft G, having a right-and-left screw cut on it, is supported in the pedestals D D, and has upon one of its ends a hand-wheel, H, of the usual construction. I is a divided nut, having a female double or right-and-left screw cut in its two separate halves or slides, in which the screw-shaft G works. The nut I has upon each of its halves a horizontal flange, *c*, from which there extends vertically a sleeve or socket, J, in which the rounded part of one of the bolts K is placed, it moving therein when the rudder is worked by the steering apparatus. On the tops of these bolts are cut screws, on each of which a capped nut is run down to hold it in place. The lower end of the bolt, which is flattened or bar-shaped, passes between the jaws *c c*, formed on an extended portion of the rudder-head ring, and thus a connection is formed between the screw-shaft and rudder-head, rigid for all the practical purposes of steering, and yet free to yield or move fore and aft or up and down to the springing or moving of the rudder-head under a heavy sea.

M M are two guard-rails, lying parallel to and in contact one with each half of the divided nut. These bars are also supported in the pedestals D, so as to move with all the other moving parts when yielding to the spring of the rudder. These bars at their ends have wedges *n n* driven behind them so as to press them respectively hard up against the slides or halves of the nut I. The object of this is to relieve the screw-shaft from the workings of the rudder in a heavy sea, and thereby prevent the shaft from being bent out of its true line, or of having its screws injured. Another object is either to enable the parts of the nut against the screw-shaft to be wedged or forced up to it should they become worn, or to produce greater friction between the nut and screw-shaft, whenever such may be desirable.

In the apparatus described in the patent granted to JESSE REED on June 5, 1849, and numbered 6,507, the bolts of the screw-slides are supported by and made to project upward from the rudder-head cap and into slots formed in ears extending respectively from the two screw-slides or nut-halves applied to the screw of the steering-wheel shaft. With this arrangement the bolts or pins are always stationary relatively to the rudder-head, while it may be turning around, but with the present improved arrangement of them—viz., so that they shall be supported by the halves of the screw-nut and work in passages or slots formed between the ears C C—the bolts are always movable relatively to the rudder-head while it may be revolving. While by the first arrangement the outward longitudinal movements of each of the slides or half-nuts are limited, their limits being determined by the bolts moving inward and bringing up against the inner ends of their slots, by the present new or improved arrangement the bolts during the outward movements of the slide or half-nuts always maintain the same distances from the shaft, and slide outward in the slots or spaces between the parts C C on each side of the rudder-head. In this way they greatly increase the leverage on the rudder-head, and are not limited in their movements as when supported by the rudder-head and made to move in slots carried by the half-nuts or slides.

What I claim is as follows, viz:

1. The arrangement and combination of the adjustable guide and guard-rails M M with the screw-shaft, or its mechanical equivalent, and its slides or two divisions of the nut I.

2. The application of the pedestals to their stanchions by means, substantially as described, for enabling the pedestals and parts supported by them to move either fore and aftwise or up and down under the action of the rudder, as specified.

CATHARINE MULLER HUNT.

Witnesses:
R. H. EDDY,
F. P. HALE, Jr.